United States Patent
Okada et al.

(10) Patent No.: US 9,147,506 B2
(45) Date of Patent: Sep. 29, 2015

(54) BUS BAR AND METHOD OF MANUFACTURING THE BUS BAR

(75) Inventors: Hiroki Okada, Aichi (JP); Masayuki Sato, Aichi (JP); Toshimitsu Kamiya, Aichi (JP)

(73) Assignee: TOGO SEISAKUSYO CORPORATION, Aichi-Gun, Aichi (JP)

( * ) Notice: Subject to any disclaimer, the term of this patent is extended or adjusted under 35 U.S.C. 154(b) by 115 days.

(21) Appl. No.: 13/978,313

(22) PCT Filed: Dec. 26, 2011

(86) PCT No.: PCT/JP2011/080052
§ 371 (c)(1),
(2), (4) Date: Jul. 3, 2013

(87) PCT Pub. No.: WO2012/117650
PCT Pub. Date: Sep. 7, 2012

(65) Prior Publication Data
US 2013/0292156 A1 Nov. 7, 2013

(30) Foreign Application Priority Data

Feb. 28, 2011 (JP) .................................. 2011-042166

(51) Int. Cl.
*H01R 43/16* (2006.01)
*H01B 5/02* (2006.01)
*H02B 1/20* (2006.01)
*H01R 25/14* (2006.01)

(52) U.S. Cl.
CPC ................. *H01B 5/02* (2013.01); *H01R 25/14* (2013.01); *H01R 43/16* (2013.01); *H02B 1/20* (2013.01)

(58) Field of Classification Search
USPC ............................................. 174/129, 133 B
See application file for complete search history.

(56) References Cited

U.S. PATENT DOCUMENTS

| 2,969,421 | A | * | 1/1961 | Scott, Jr. ................... 174/117 R |
| 4,203,053 | A | * | 5/1980 | Shepard ........................ 315/254 |
| 2002/0043882 | A1 | * | 4/2002 | Tanaka et al. ................... 310/71 |
| 2003/0045158 | A1 | * | 3/2003 | Suzuki et al. ................. 439/404 |

(Continued)

FOREIGN PATENT DOCUMENTS

| JP | 04-118874 | 4/1992 |
| JP | 2003-102119 | 4/2003 |
| JP | 2004-032960 | 1/2004 |

(Continued)

OTHER PUBLICATIONS

International Search Report dated Jan. 31, 2012, in International Patent Application No. PCT/JP2011/080052.
Notification of Reasons for Refusal dated May 27, 2014, for corresponding Japanese Patent Application No. 2011-042166.
Decision of Refusal dated Jan. 20, 2015, for corresponding Japanese Patent Application No. 2011-042166.

*Primary Examiner* — William H Mayo, III
*Assistant Examiner* — Krystal Robinson
(74) *Attorney, Agent, or Firm* — Thomas, Karceski & Karmilovich, PC

(57) ABSTRACT

A bus bar includes a body having at least one bent portion and a plate-shaped or bar-like terminal located on at least one end of the body and formed of a material identical with a material of the body integrally with the body in a seamless manner. The terminal is formed by pressurizing the end of the body thereby to be plate-shaped or bar-like and having a higher hardness than the bent portion. The body is solid and linear in shape. The terminal is formed so that its profile has a required predetermined size by adjusting an applied pressure value.

15 Claims, 7 Drawing Sheets

(56) References Cited

U.S. PATENT DOCUMENTS

| | | | |
|---|---|---|---|
| 2003/0236016 A1* | 12/2003 | Murakami et al. | 439/212 |
| 2004/0065463 A1* | 4/2004 | Ishiguro et al. | 174/59 |
| 2006/0003610 A1* | 1/2006 | Watanabe et al. | 439/76.2 |

FOREIGN PATENT DOCUMENTS

| | | |
|---|---|---|
| JP | 2004-040945 | 2/2004 |
| JP | 2004-336912 | 11/2004 |
| JP | 2011-004520 | 1/2011 |

* cited by examiner

BUS BAR AND METHOD OF MANUFACTURING THE BUS BAR

CROSS-REFERENCE TO RELATED APPLICATION(S)

This is a National Stage Entry into the United States Patent and Trademark Office from International PCT Patent Application No. PCT/JP2011/080052, having an international filing date of Dec. 26, 2011, which claims priority to Japanese Patent Application No. 2011-042166, filed Feb. 28, 2011, the contents of both of which are3 incorporated herein by reference in their entireties.

FIELD OF THE INVENTION

The present invention relates to a bus bar and a method of manufacturing the bus bar.

DESCRIPTION OF THE RELATED ART

For example, bus bars are known which electrically connect between terminal blocks of an inverter device, a battery or the like (see Japanese Patent Application publication No. JP-A-2011-4520,for example). One of the bus bars includes a body having a bent portion to which a bending work is applied and terminals provided on ends of the body respectively. Accordingly, the body of the bus bar is formed of a relatively soft material having such flexibility as to be formed into the bent portion. On the other hand, each terminal of the bus bar is threadably mounted to the terminal block, for example. In this case, each terminal necessitates a certain degree of hardness. Accordingly, a terminal member formed of a material different from that of the body is mounted to the body by welding, pressure bonding or the like.

However, the terminal formed of the material different from that of the body necessitates a work of welding, pressure bonding or the like to the body, thereby reducing the yield. It is now considered to provide the body with screw holes through which screws are inserted and which are used as terminals for the purpose of improving the yield or workability. In this case, however, there is a possibility that the body having a predetermined flexibility may be deformed during the mounting to the terminal block. On the other hand, it is also considered that the body be formed of a material having hardness required of the terminal. However, it would be difficult to apply a bending work to the material having a high hardness. Thus, what is required of the bus bar is to reduce the hardness of the material in order that workability of the body may be improved but to reduce the hardness of the material in order that deformation of the terminals may be suppressed. According, ordinary bus bars have a problem of difficulty in balancing securement of workability and improvement in the yield.

SUMMARY OF THE INVENTION

The present invention was made in view of the foregoing circumstances or the like and an object thereof is to provide a bus bar which can balance securement of workability and improvement in the yield and a method of manufacturing the bus bar.

The present invention provides a bus bar including a body having at least one bent portion and a plate-shaped or bar-like terminal provided on at least one end of the body and formed of a material identical with a material of the body integrally with the body in a seamless manner, the terminal being formed by pressurizing the end of the body thereby to be plate-shaped or bar-like and having a higher hardness than the bent portion. The body is solid and linear in shape and a the terminal is formed so that a profile thereof has a required predetermined size by adjusting an applied pressure value. The term, "bar-like" is intended to include a shape such as a prismatic column with a rectangular section as well as a shape with a circular or elliptic section. According to the above-described construction, the bent portion can easily be formed since the body has a lower hardness than the terminal. Accordingly, the body can secure workability necessary in the application of a bending work. On the other hand, the possibility of deformation of the terminal can be reduced in the mounting since the terminal has a higher hardness than the bent portion. Furthermore, the terminal is formed of the same material as of the body integrally with the body in a seamless manner. Accordingly, a terminal formed of a material different from one of the body need not be welded or pressure-bonded for the purpose of forming the terminal. This can reduce the number of steps in the manufacture of bus bars with the result of improvement in the yield. Thus, the bus bar can balance securement of workability and improvement in the yield.

The terminal is formed by folding and stacking the end of the body. When the body is formed into the shape of a flat plate, for example, there is a possibility that the terminal would have a smaller thickness than the body with work hardening. In this case, a cross-sectional area for electrical conduction is reduced with the result of possible heat generation in high voltage and high frequency ranges. In view of the problem, the end of the body is folded to be stacked, whereby the thickness of the terminal is compensated after work hardening. Consequently, heat generation can be suppressed in boundaries between the body and the terminal. The foregoing can be applied to the case where the body with a shape other than the flat plate shape is used.

The end of the body in the terminal is annularly folded so that a hole is formed inside, and the end of the body has a distal end stacked on the body or the end of the body. The term, "annularly" is intended to include an annular shape formed into a true circle, any shape other than a true circle, including a straight or elliptical part, a partially discontinuous C-shape or arc shape. In this case, the terminal has a through screw hole which is generally used to mount the bus bar to a terminal block. In this case, when the screw hole is formed by cutting with the use of a drill or the like or pressing with the use of a punch, material loss is caused in a cut part. In view of this, the end of the body is annularly folded so that a hole is defined, and the hole is used as the screw hole. This can reduce an amount of work to form the screw hole after the forming of the terminal and can also suppress material loss in the cutting. Consequently, the yield of bus bars can be improved and manufacturing cost can be reduced.

Either the end of the body folded in the terminal or a side of the body opposed to the folded end has a misalignment preventing portion which prevents misalignment between the folded end and the side of the body opposed to the folded end. When the end of the body is folded and stacked on the body, there is a possibility that misalignment may occur between the folded end of the body and the side of the body opposed to the folded end with work hardening. In view of this problem, the misalignment preventing portion is provided on either the end of the body folded in the terminal or the side of the body opposed to the folded end, whereupon misalignment can be prevented between the folded end of the body and the side of the body opposed to the folded end. Consequently, the terminal can be formed so as to have a desired thickness after work hardening.

The terminal is formed integrally with the body in the seamless manner together with the compensating member. The compensating member is provided for compensating the thickness of the terminal after working and formed of the identical material as that of the body. As a result, the thickness of the terminal after work hardening is compensated in the similar manner as in the above-described invention Accordingly, heat generation can be suppressed in boundaries between the body and the terminal.

At least either the compensating member or the body has a side which is opposed to the other and has a misalignment preventing portion which prevents misalignment between the compensating member and the body. Consequently, the terminal can be formed so as to have a desired thickness while relative misalignment is prevented between the compensating member and the body, in the same manner as in the above-described invention.

The body is formed in a three-dimensional manner so as to have a plurality of bent portions with different bending directions. In this case, more flexibility is required of the body since the plural bent portions having different bending directions are formed. Even in this case, the terminal is formed of the same material as that of the body in the seamless manner integrally with the body and is further formed so as to have a higher hardness than the bent portion. Accordingly, the bus bar can balance securement of workability and improvement in the yield.

At least one bent portion is formed on the body and pressure is applied to at least one end of the body thereby to form a plate-shaped or bar-like terminal on the body and simultaneously, to render a hardness of the terminal higher than a hardness of the body. As a result, the terminal is formed of the same material as that of the body in the seamless manner integrally with the body and is further formed into a plate shape or a bar shape so as to have a higher hardness than the bent portion. Thus, the number of working steps is reduced by simultaneously executing the forming of the terminal and the work hardening. Consequently, the bus bar can be manufactured which balances securement of workability and improvement in the yield as described above.

DETAILED DESCRIPTION OF EMBODIMENTS(S) OF THE INVENTION

Several embodiments of bus bars will be described with reference to the accompanying drawings. Identical or similar parts are labeled by the same reference symbols throughout the embodiments and overlapping description is eliminated.

Figure 1:
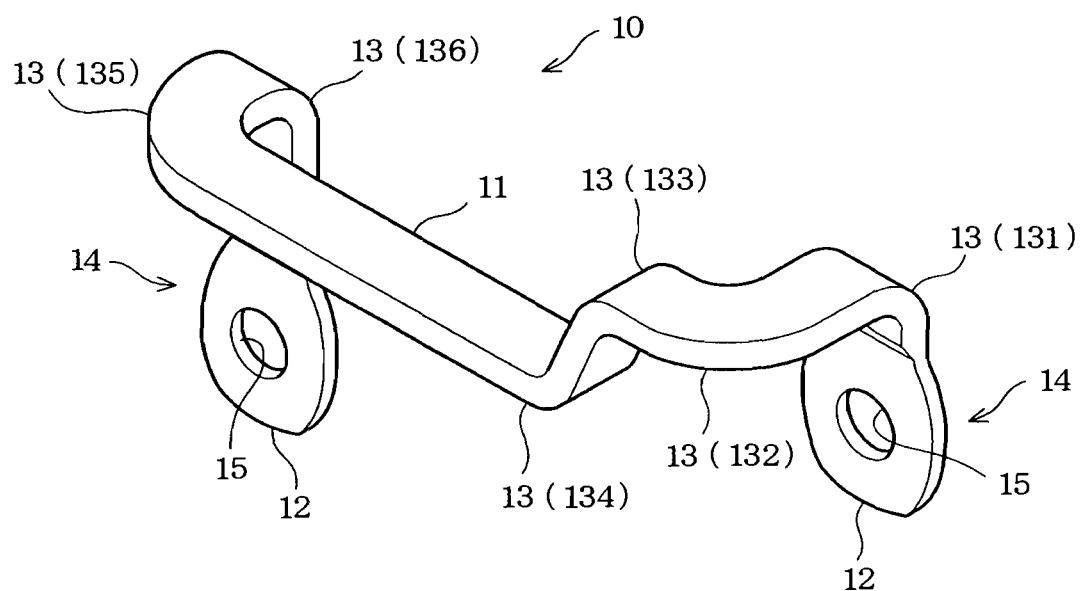
FIG. 1 is a schematic perspective view showing an outline of the a bus bar according to a first embodiment.

The bus bar and the bus bar manufacturing method according to a first embodiment will be described with reference to FIGS. 1 to 5. The bus bar 10 includes a body 11 and two terminals 12 as shown in FIG. 1. The body 11 is formed into the shape of a flat plate having a rectangular section. The body 11 should not be limited to the rectangular section but may be formed into different shapes including a bar shape with a circular section, or with an elliptic or H-shaped section. The body 11 has a plurality of bent portions 13. The bent portions 13 of the body 11 include bent portions 131, 133, 134 and 136 each formed by a flatwise bending method in which each bent portion is bent in a direction of plate thickness of the flat plate-shaped body 11. Bent portions 132 and 135 are formed by an edgewise bending method in which each bent portion is bent in a direction of plate width of the body 11. When the description is common to all the bent portions 131 to 136, the "bent portions 13" will be used in the following description, instead of the bent portions 131 to 136. Thus, the body 11 is three-dimensionally formed so as to have one or more bent portions 13. In other words, the body 11 is formed of a material having high flexibility and workability such that the material is three-dimensionally bendable. In the embodiment, the body 11 is formed of oxygen-free copper C1020-0 (JIS H 3260) which is obtained by annealing pure copper having a high electrical conductivity property thereby to have the high workability. A position and a bending direction of each bent portion 13 are determined according to the shape of a terminal block (not shown) to which the bus bar 10 is mounted, or the like.

The terminals 12 are provided on both ends of the body 11 respectively. Each terminal 12 is formed into the shape of a plate having a larger profile and a smaller thickness than the body 11. The terminals 12 are formed by crushing respective ends 14 of the body 11 in the direction of plate thickness. More specifically, each terminal 12 is formed of the same material as of the body 11 integrally with the body 11 in a seamless manner. Each terminal 12 is formed so as to have a higher hardness than the body 11 as the result of work hardening resulting from plastic deformation due to stress caused by the crushing. The terminals 12 have through screw holes 15 used to mount the bus bar 10 to the terminal block (not shown), respectively.

The bus bar 10 configured as described above is mounted to terminals of the terminal blocks, thereby electrically connecting between the terminal blocks. More specifically, the bus bar 10 is used, for example, as a wiring member in an inverter device or as a connecting member to an external power source. Thus, the bus bar 10 is employed in a power supply path through which a relatively larger current than through a general signal path flows.

Figure 2:
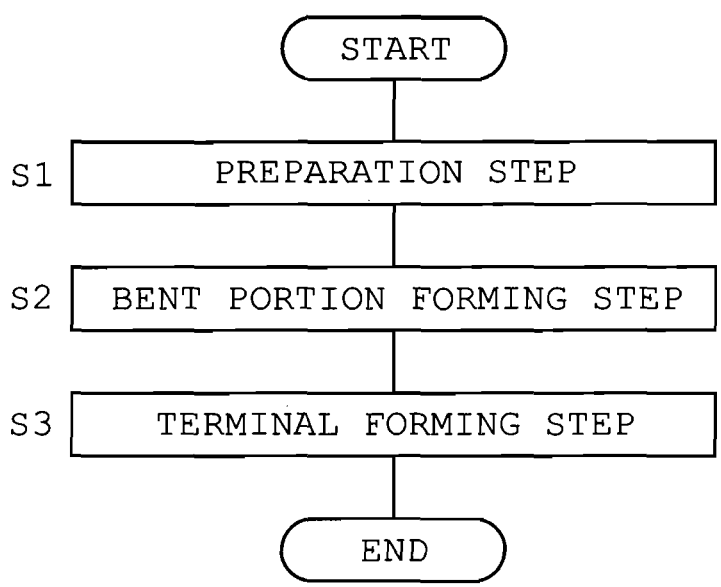
FIG. 2 illustrates a flow of manufacture of the bus bar according to the first embodiment.
Figure 3A:
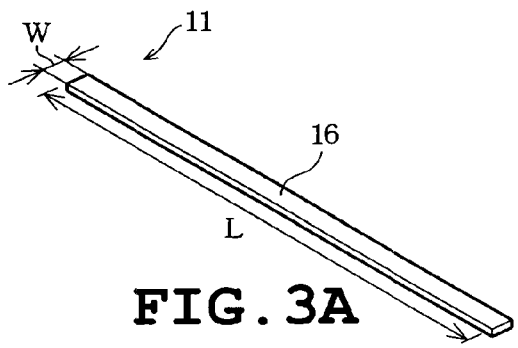
FIGS. 3A to 3H are schematic views showing a pressing step for the bus bar according to the first embodiment respectively.

The working of the bus bar 10 configured as described above will now be described together with a method of manufacturing the same. A manufacturing process of the bus bar 10 roughly includes a preparation step, a bent portion forming step and a terminal forming step to be executed, as shown in FIG. 2. The linear body 11 is prepared in the preparation step (step S1). More specifically, a linear base material 16 constituting a part of the body 11 is prepared in this case. The term, "linear" indicates a condition of the base material 16 having a length L larger than a width W thereof, as shown in FIG. 3A. In other words, a linear body defined in the claims should not be limited to the above-described bar-shaped one with the circular cross section but may have another shape such as an elliptic shape or an H-shape. The base material 16 is formed into the same flat plate shape as the body 11 by extrusion. Thus, the linear base material 16 constituting a part of the body 11 is prepared.

Figure 3B:
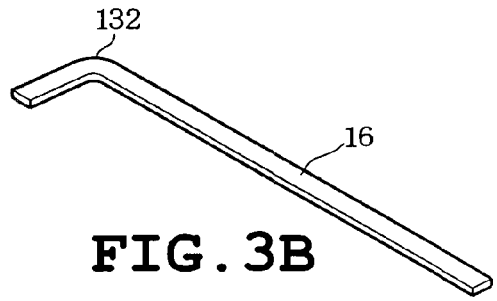
Figure 3C:
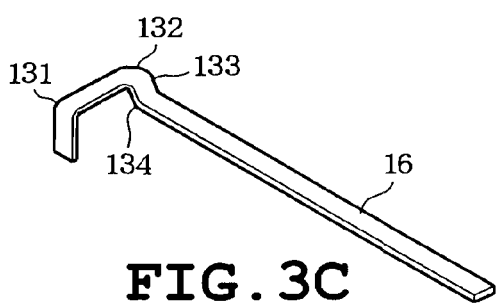
Figure 3D:
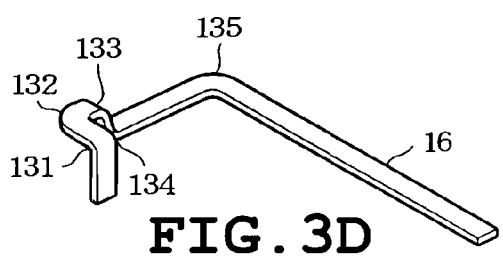
Figure 3E:
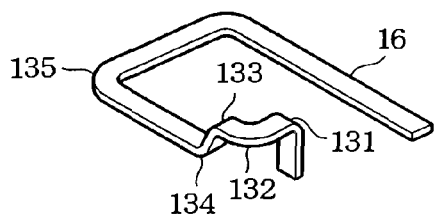
Figure 3F:
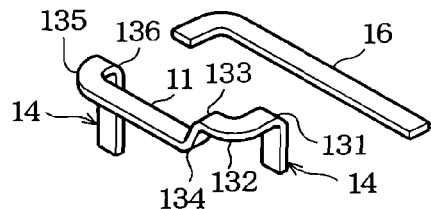

A plurality of bent portions 13 is formed on a plurality of portions of the body 11 corresponding to the body 11 in the bent portion forming step (step S2). In this case, the bent portions 13 are formed on the body 11 sequentially in the order from FIG. 3B to FIG. 3F. The bent portions 13 are formed on a moving assembly line by a forming machine or an NC bending machine. More specifically, a portion of the base material 16 corresponding to the body 11 is firstly bent by the edgewise bending method so as to be formed into the bent portion 132 bent about 90° in the direction of plate width, as shown in FIG. 3B. Subsequently, portions of the base material 16 corresponding to the body 11 are bent by the flatwise bending method so as to be formed into the bent portions 131, 133 and 134 bent about 90° in the direction of plate thickness, as shown in FIG. 3C, respectively. Further subsequently, the bent portion 135 is formed by the edgewise bending method as shown in FIG. 3D, and the base material 16 is then bent into the state as shown in FIG. 3E. The base material 16 is then bent into the bent portion 136 as shown in FIG. 3F. Thereafter, the body 11 is separated from the base material 16, whereby the body 11 having both ends 14 is formed.

At least one bent portion 13 is thus formed on the body 11 in the bent portion forming step. In the embodiment, the body 11 has a plurality of bent portions 13 formed by the edgewise and flatwise bending methods so that the bending directions differ from or intersect one another. In other words, the body 11 is formed with more than two bent portions 13 having respective axial directions intersecting with or differing from one another thereby to have a three-dimensionally steric structure.

Figure 3G:
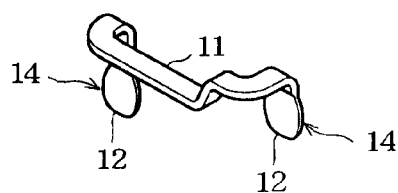
Figure 4:
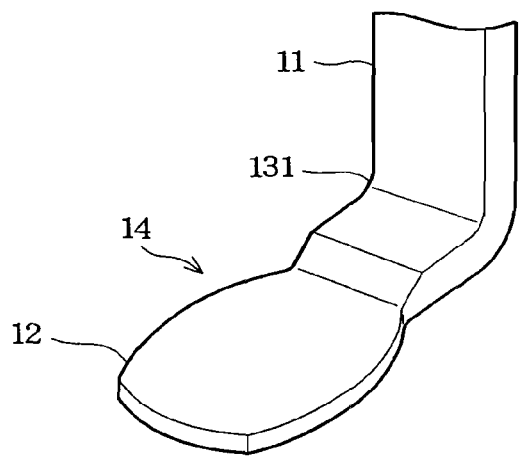
FIG. 4 illustrates a terminal of the bus bar according to the first embodiment.

In the terminal forming step (step S3), the terminals 12 are formed on the respective ends 14 of the body 11 on which the bent portions 13 have been formed. More specifically, the ends 14 of the body 11 are pressurized by a press machine (not shown) as shown in FIG. 3G, in which reference symbols of the respective bent portions are eliminated. The ends 14 are crushed by the pressing step with the result that each end 14 is formed into the terminal 12 having a larger profile and a smaller thickness than the body 11 as shown in FIG. 4. Simultaneously, the hardness of each crushed terminal 12 becomes higher than those of the body 11 and bent portions 13 as the result of work hardening. In the embodiment, the hardness (Vickers hardness) of each end 14 of the body 11 formed of the oxygen-free copper (C1020-0) is increased to about HV80 which value corresponds to a strain hardened (C1020-H) metal material work-hardened by cold working. The thickness of each terminal 12 is substantially uniform over an entire surface.

Figure 3H:
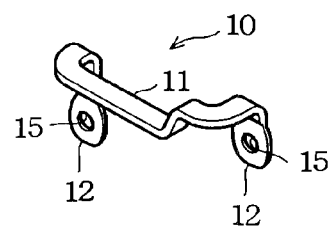

Subsequently, through screw holes 15 are formed through the respective terminals 12 as shown in FIG. 3H. The screw holes 15 are simultaneously formed by a press machine (not shown). Since the directions of the terminals 12 are the same, the press machine used in the embodiment is capable of simultaneously forming the screw holes 15 through the respective terminals 12.

The body 11 necessitates flexibility such that the bent portions 13 are formed thereon in the three-dimensional manner. In particular, when the edgewise bending is applied to the flat plate-shaped body 11, a certain reduction in the plate width is required of the body 11. In this case, it can be expected that the screw hole would become larger than the body 11. Even in such a case, however, each terminal 12 is formed so as to have a larger profile than the body 11 in the above-described terminal forming step. Consequently, a large screw hole 15 for M6 Size, for example, can be provided.

Figure 5:
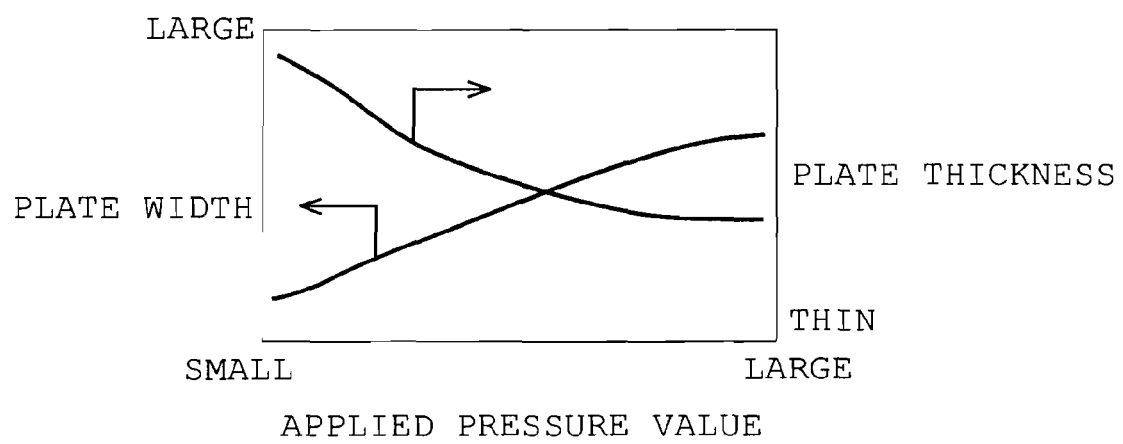
FIG. 5 is a schematic graph showing the relationship between an applied pressure value and a plate thickness and width in the first embodiment.

In this case, the profile and the thickness of each terminal 12 each correlate with an applied pressure value indicative of pressure applied to each end 14 of the body 11 as shown in FIG. 5. More specifically, the profile, namely, the plate width of each terminal 12 is increased with increase in the applied pressure value. On the other hand, the thickness, namely, the plate thickness of each terminal 12 is reduced with increase in the applied pressure value. Accordingly, the applied pressure value is adjusted so that each terminal 12 is formed so as to have a size necessary for the screw hole 15. That is, the shape of each terminal 12 is adjusted by varying the applied pressure value while the hardness required of each terminal 12 has been ensured. The bus bar 10 is formed through the above-described manufacturing steps so as to include the body 11 having the three-dimensional spread by the plural bent portions 13 and the terminals 12 each having a higher hardness than the body 11.

The bus bar 10 as described above can achieve the following advantageous effects. The bus bar 10 includes the body 11 formed of the oxygen-free copper (C1020-H) having a high workability. Accordingly, the bent portions 13 can easily be formed on the body 11, with the result that a predetermined workability can be ensured. Furthermore, the terminals 12 are formed by pressing both ends 14 of the body 11 respectively. As a result, the hardness of each terminal 12 is increased to the value corresponding to the hardness of the strain hardened material (C1020-H) by work hardening. This can suppress the possibility of deformation of the terminals 12 during the mounting to the terminal block. Furthermore, each terminal 12 is formed of the same material as of the body 11 integrally with the body 11 in the seamless manner. Accordingly, each terminal 12 of the separate member need not be welded or pressure bonded to the body 11, with the result that the yield can be improved. In other words, the bus bar 10 can balance securement of workability and improvement in the yield.

The body 11 has the bent portions 13 formed by applying the edgewise and flatwise bending manners, thereby being formed into the three-dimensional configuration. In this case, the flat plate-shaped body 11 is required to have a plate width reduced to some degree since the edgewise bending is applied to the body 11. Accordingly, there is the possibility that the plate width of the body 11 may become smaller than that necessary for the forming of the screw hole 15. Even in this case, the profile of each terminal 12 can be formed into a desired size by adjusting the pressure value to be applied to each terminal 12. Consequently, even when the body 11 is formed into the flat plate shape, each terminal 12 having a high hardness and a size necessary for the screwing. Furthermore, each terminal 12 is formed by pressing so that the thickness thereof becomes uniform. This can prevent the bus bar 10 from becoming rickety when the bus bar 10 is screwed to a terminal block.

The base material 16 including the body 11 is formed by extrusion or drawing. As a result, the body 11 can be prevented from occurrence of burr. This can denecessitates a burring work, thereby improving the yield. Furthermore, an increase in the production cost with burring, that is, loss in the material can be suppressed. Still furthermore, when the base material 16 is formed by extrusion or drawing, a mouth ring (dies) of the forming machine can reduce a tolerance of the cross-sectional shape, that is, a cross-sectional area for electrical conduction of the body 11. This can further reduce variations in the cross-sectional area for electrical conduction of the body 11. Consequently, heat generation of the body 11 due to variations in the cross-sectional area for electrical conduction can be reduced.

The bent portions 13 are formed by the forming machine or the bending machine. Accordingly, the body 11 can be formed so as to have the three-dimensional structure in which the body 11 has at least two bent portions 13 having bending directions intersecting with or differing from each other. Furthermore, the shape of the body 11 can freely be designed regardless of an expanded shape only if the body 11 is unicursal. Accordingly, various shapes of bus bars 10 can be manufactured. Furthermore, since each bent portion 13 has a small change in the sectional area of the body 11, heat generation can be reduced in each bent portion 13. Moreover, the forming by the forming machine or the bending machine results in no material loss, differing from a transfer press using a coil material. This can reduce the manufacturing cost.

The screw holes 15 of the respective terminals 12 are formed simultaneously by the press machine, with the result that the pitches between the screw holes 15 are uniformed. Consequently, variations in the mechanical quality of the bus bars 10 can be suppressed, whereby the yield can be improved.

According to the above-described manufacturing method, at least one bent portion 13 is formed on the relatively softer linear body 11. Subsequently, pressure is applied to at least one end 14 of the body 11 so that the plate-shaped terminal 12 having a larger profile and smaller thickness than the body 11 is formed. In this case, the hardness of the end 14 is rendered higher than that of the body 11 by work hardening with the pressing. Consequently, the terminal 12 is formed integrally with the body 11 in the seamless manner so as to have a higher hardness than the body 11. Thus, the work efficiency is improved by simultaneous execution of the forming of the terminal 12 and the work hardening. This can realize manufacture of the bus bar 10 balancing securement of workability and improvement in the yield.

The bus bar according to a second embodiment will be described with reference to FIGS. 6 and 7. The bus bar according to the second embodiment differs from the first embodiment in that the thickness of each terminal is compensated. The body of the bus bar and the rough flow of the manufacturing method are common to the first and second embodiments. Accordingly, the following will mainly describe the terminals of the bus bar.

When each terminal and the body have different thicknesses, that is, when the body includes a portion having a reduced sectional area for electrical conduction, a resistance value of the portion is increased in high voltage and high frequency ranges. In this case, it is concerned that heat is generated in the afore-mentioned portion having the reduced sectional area for electrical conduction. In view of this, the thickness of each terminal whose thickness is reduced after the application of pressure is compensated in the embodiment.

Figure 6A:
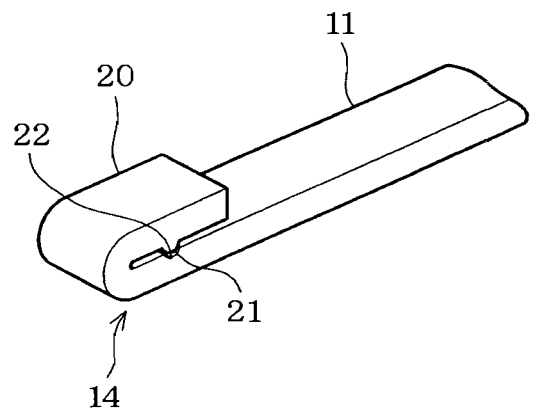
FIGS. 6A to 6C illustrate a pressing step for the terminal of the bus bar according to a second embodiment.
Figure 6B:
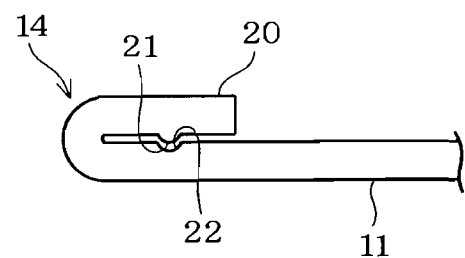

The bus bar according to the second embodiment has a folded portion 20 formed at the end 14 of the body 11 as shown in FIG. 6A. The folded portion 20 is folded upward relative to the body 11 to be stacked on the body 11 as viewed in FIG. 6A. The folded portion 20 has a convex portion 21 formed on a side thereof opposed to the body 11. The convex portion 21 is located so as to correspond to a concave portion 22 provided in the body 11 when the folded portion 20 has been stacked on the body 11. More specifically, the convex portion 21 engages the concave portion 22 when the folded portion 20 has been stacked on the body 11, as shown in FIG. 6B. The convex and concave portions 21 and 22 prevent misalignment between the folded portion 20 and the body 11 during the pressing. Thus, the convex and concave portions 21 and 22 serve as a misalignment preventing portion defined in the claims.

Figure 6C:
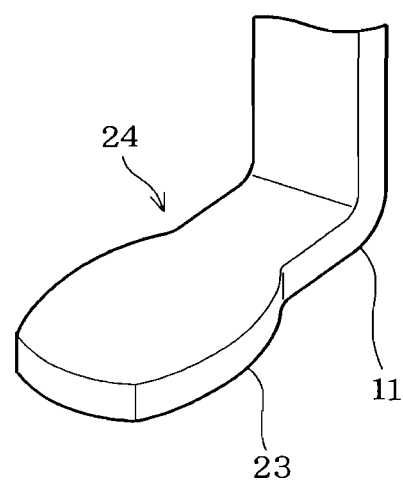

In the above-described state, pressure is applied to the end 14 of the bus bar including the folded portion 20 and the body 11 in the terminal forming step in the same manner as in the first embodiment. As a result, the terminal 23 without misalignment is formed as shown in FIG. 6C. In this case, contact surfaces of the folded portion 20 and the body 11 get into the same state as diffusion weld due to heat generation during the pressing. Consequently, the folded portion 20 and the body 11 are formed integrally with each other in the seamless manner, and the terminal 23 and the body 11 are also formed integrally with each other in the seamless manner. The hardness of the terminal 23 is increased by the work hardening in the same manner as in the first embodiment.

Figure 7A:
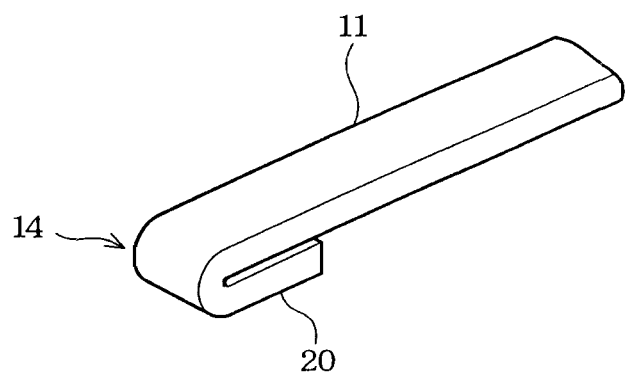
FIGS. 7A and 7B schematically illustrate other examples of the terminal of the bus bar according to the second embodiment respectively.
Figure 7B:
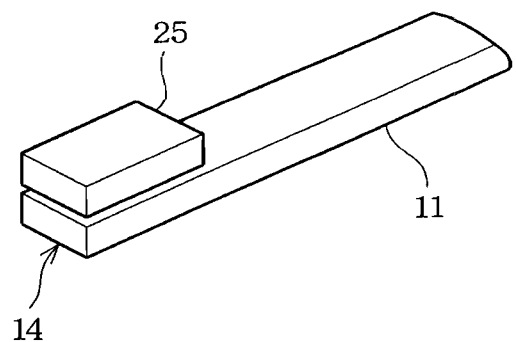

In this case, the direction in which the end 14 of the body 11 is folded should not be limited to that shown in FIG. 6A. The end 14 may be folded downward relative to the body 11 as shown in FIG. 7A. Alternatively, a compensating member 25 formed of the same material as of the body 11 may be stacked on the body 11 thereby to be formed into the terminal 23 as shown in FIG. 7B, instead of provision of the folded portion 20. In any one of these three cases, the thickness of the terminal 23 is compensated after the pressing, whereby the terminal 23 is formed so as to have substantially the same thickness as the body 11. Consequently, a neck 24 that is a boundary between the body 11 and the terminal 23 has a cross-sectional area for electrical conduction substantially corresponding to that of the body 11. The screw hole (not shown) is formed through the terminal 23.

According to the second embodiment as described above, the thickness of the terminal 23 becomes substantially equal to that of the body 11 after completion of the pressing. As a result, reduction in the cross-sectional area for electrical conduction of the boundary between the body 11 and the terminal 23 is reduced with the result that heat generation can be suppressed in the neck 24.

The folded portion 20 and the body 11 have the convex and concave portions 21 and 22 serving as the misalignment preventing portion, respectively, whereby misalignment between the folded portion 20 and the body 11 is prevented during the pressing step. Consequently, the terminal 23 can be formed so as to have a desired thickness. In this case, the misalignment preventing portion should not be limited to the convex and concave portions 21 and 22 but may take any form that can prevent misalignment between the folded portion 20 and the body 11. The misalignment preventing portion may be provided using a surface treatment by knurling such hairline finish or serration, resistance welding such as spot welding, temporary joint treatment such as tungsten inert gas (TIG) welding or laser welding and electrically conductive adhesive agent. Any one of these means may be employed only if misalignment can be prevented between the folded portion 20 and the body 11, and means and method for obtaining the misalignment preventing portion should not be limited. Furthermore, the misalignment preventing portion may be provided on one of the surfaces of the body 11 and the compensating member 25 opposed to each other.

The bus bar according to the second embodiment is formed so that the terminal 23 and the body 11 have substantially the same thickness. For example, when oscillation or vibration is applied to the bus bar, stress is assumed to concentrate on the neck 24 as the boundary between the body 11 and the terminal 23. Even in this case, the mechanical strength of the neck 24 can be increased and the vibration proof can be improved since the terminal 23 is formed so as to have substantially the same thickness as the body 11.

The bus bar according to a third embodiment will be described with reference to FIGS. 8 and 9. The bus bar according to the third embodiment differs from that according to the first embodiment in the step of forming the screw hole through the terminal. The body of the bus bar and the rough flow of the manufacturing method are common to the first and third embodiments. Accordingly, the following will mainly describe the terminals of the bus bar.

Figure 8A:
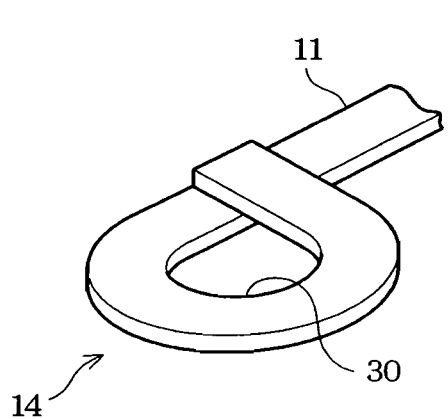
FIGS. 8A and 8B schematically illustrate a pressing step for the terminal of the bus bar according to a third embodiment.
Figure 8B:
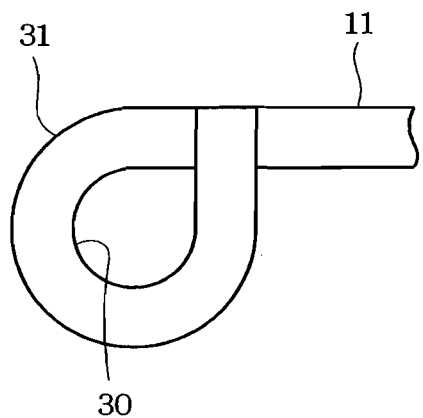

In the bus bar according to the third embodiment, the end 14 of the body 11 is annularly folded before the terminal forming step as shown in FIG. 8A. The end 14 is folded about three-quarters of the circumference to be stacked on the body 11. More specifically, the end 14 of the body 11 is formed into a generally annular shape. When pressure is applied to the end 14 in the stacked state, the terminal 31 with the hole 30 is formed as shown in FIG. 8B. The hole 30 is available as the through screw hole. The terminal 31 with the hole 30 is thus formed by folding the end 14 of the body 11 substantially into the annular shape, stacking the folded end 14 on the body 14 and pressing the stacked end 14. For example, when the screw hole is formed by cutting with the use of a drill or by pressing with the use of a punch, the cutting work or the pressing work results in material loss in a cut portion. In the embodiment, however, the end 14 is folded into the generally annular shape so that the hole 30 is formed, whereby the cutting work becomes unnecessary with the result of reduction in material loss. This can reduce the manufacturing cost. Furthermore, since the hole 30 is formed by annularly folding the end 14, the work for providing the screw hole can be simplified with the result of improvement in the productivity.

Figure 9A:
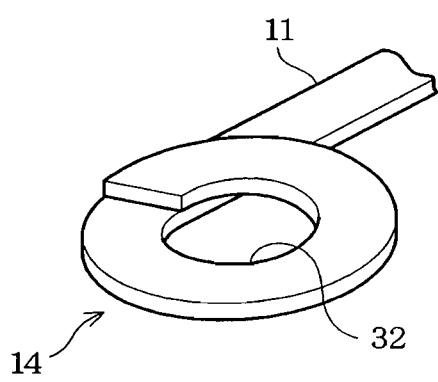
FIGS. 9A and 9B schematically illustrate another pressing step for the terminal of the bus bar according to the third embodiment.
Figure 9B:
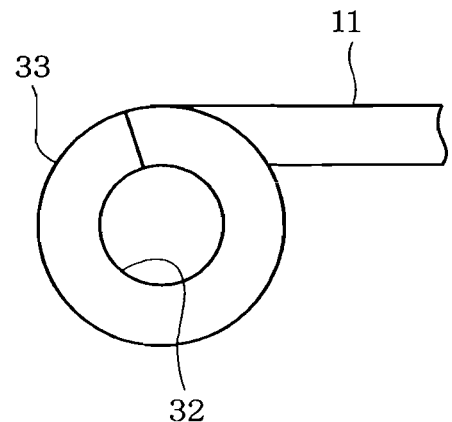

Furthermore, the end 14 of the body 11 may be folded substantially into the annular shape about a whole circumference and stacked on the body 11, as shown in FIG. 9A. The terminal 33 with the hole 32 is formed even in this case as shown in FIG. 9B. When the hole 32 is used as the through screw hole, the number of manufacturing steps and the material loss can be reduced as described above. In this case, needless to say, the thickness of the terminal may be compensated after the pressing and/or the misalignment preventing portion may be provided on the opposed surfaces of the terminal and the body.

The invention should not be limited to the above-described embodiments but may be modified or expanded as follows. Although the bus bar having a plurality of bent portions 13 is exemplified above, the bus bar may have a single bent portion 13.

Although the flat plate-shaped body 11 is exemplified in the above-described embodiments, a body 41 of a bus bar 40 may be formed using a bar-like material having a circular sectional shape. In this case, the body 41 is formed by the extrusion or the drawing in the same manner as in the first embodiment. Furthermore, when the body 41 is bar-shaped, the directions of terminals 42 are alternated more easily as compared with the case of the flat plate-shaped body 11. More specifically, the bus bar 40 having the bar-shaped body 41 can increase the degree of freedom in the direction of the terminal 42. Consequently, the bus bar 40 can be manufactured which includes the body 41 providing a shortest and optimum current flowing passage according to the direction of the terminal block on which the bus bar 40 is mounted. In this case, an amount of material necessary to connect between the terminal blocks is reduced with the result of reduction in the manufacturing cost.

FIGS. 3A to 3H show a sequence in which the bent portions 13 are formed on the base material 16 in the first embodiment. The shown forming sequence is merely an example, and a forming sequence of the bent portions 13 should not be limited to that shown in FIGS. 3A to 3H. For example, the bent portions 36 may be formed after the body 11 has been separated from the base material 16. Furthermore, although the bodies 11 and 41 are formed by the extrusion or the drawing, a rolled material may be slit or cut by pressing.

Although the oxygen-free copper is exemplified as the material for the bus bar, the material should not be limited to the oxygen-free copper. The bus bar may be formed of an electrically conductive material causing work hardening, such as brass, phosphor bronze, aluminum, alloys thereof, a clad material, a plated material or an enamel-coated material.

Although the terminal 23 is formed so as to have substantially the same thickness as the body 11 in the second embodiment, the terminal 23 may be formed so as to be thinner than the body 11. More specifically, the thickness of the terminal 23 may be set to any value when the body 11 has a cross-sectional area for electrical conduction substantially equal to that of the terminal 23. Furthermore, although the press machine is exemplified as means for pressing the terminals 12, 23 and 42, a rolling machine may be used to press the terminals. Furthermore, the terminal forming step may be executed with the bent portion forming step.

Although the terminals 12, 23 and 42 are maintained in the respective shapes formed by pressing, trimming may be applied to the terminals for change of the shapes thereof according to a shape of the terminal block to which the bus bar is mounted or the presence/absence of a component in close proximity.

The circular screw hole 15 is provided in the first embodiment and the annular holes 30 and 32 are used as the screw hole in the third embodiment. However, a generally C-shaped, arc-shaped or elongated screw hole may be provided, instead. Furthermore, when the directions of the terminals are alternated, the screw holes 15 may be formed by a drill or a punch.

Figure 10:
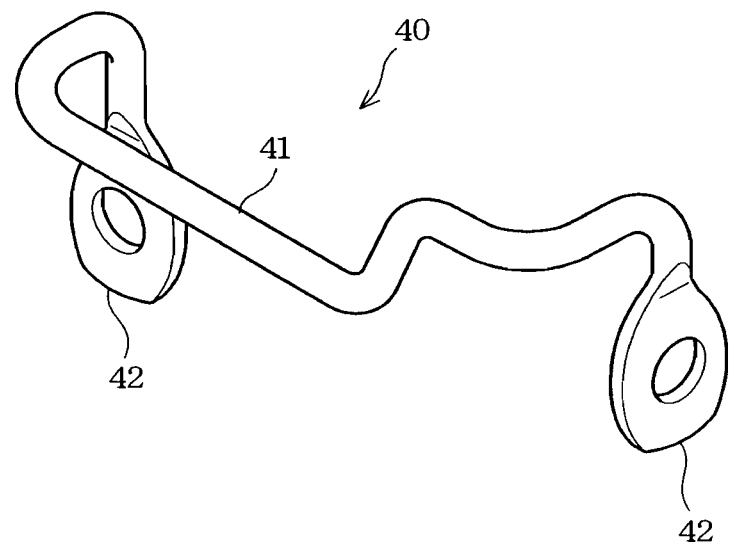
FIG. 10 is a perspective view of a bus bar according to another embodiment.

Although the terminal is plate-shaped in each embodiment, the terminal may be formed into the shape of a bar. For example, the plate-shaped body 11 in the first embodiment may be pressed from the direction of width of the body 11, or the body 41 as shown in FIG. 10 may be pressed from two directions perpendicular to each other thereby to be formed into the shape of a square prism. In this case, the screw hole may or may not be formed through the bar-shaped terminal. When no screw hole is provided, the plate-shaped or bar-shaped terminal may be inserted into the terminal block thereby to be held.

Figure 11:
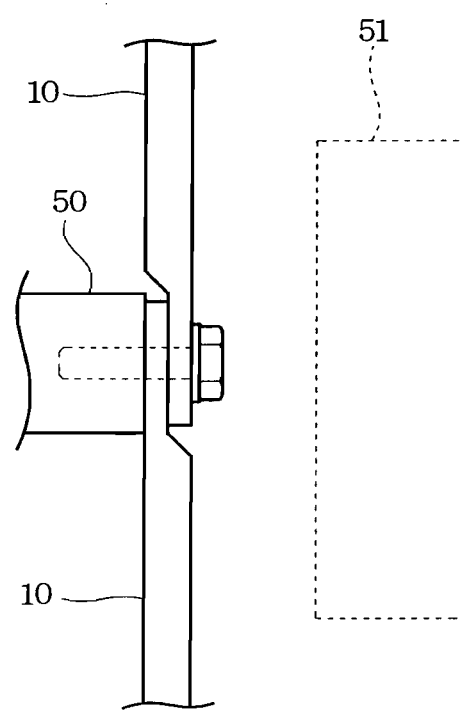
FIG. 11 is a schematic view of the bus bar in the mounted state according to further another embodiment.

The direction in which the terminal 42 is pressed may be set optionally. For example, when a plurality of bus bars 10 according to the first embodiment is tightened together to a single terminal block, the pressing direction, that is, the directions in which the ends 14 of the body 11 are crushed may be opposed to each other as shown in FIG. 11. As a result, the distance from the terminal block 50 to the outermost surface of the bus bar 10 can be shortened, whereupon equipment to which the bus bar 10 is mounted can be rendered small-sized. On the other hand, a space between the bus bar 10 to which high voltage is applied and a peripheral component 51, that is, an air gap is increased when the size of the equipment may remain the same. Consequently, the insulating performance can be improved. In this case, size reduction in the equipment can further be enhanced when a bend radius of the bent portion 13 can be reduced, that is, when the workability of the body 11 is high. In other words, the bus bar 10 including the body 11 formed of a soft material and the work-hardened terminal 12 can be expected to achieve a size reduction in the equipment to which the bus bar 10 is applied and an improvement in the insulating performance as well as balance securement of workability and improvement in the yield.

Explanation Of Symbols

In the drawings, reference symbols 10 and 40 designate bus bars, 11 and 41 bodies, 12, 23, 31, 33 and 42 a terminal, 13 a bent portion, 14 an end, 21 a convex portion (misalignment preventing portion), 22 a concave portion (misalignment preventing portion), 25 a compensating member and 30 and 32 holes.

The invention claimed is:

1. A bus bar comprising:
   a body having at least one bent portion; and
   at least one of a plate-shaped or bar-like terminal provided on at least one end of the body, formed of a material identical with a material of the body and seamlessly integral with the body, the terminal being formed by pressing the at least one end of the body such that the terminal has a higher hardness than the bent portion and being formed by folding the at least one end of the body; and
   a misalignment prevention portion provided on the terminal to prevent misalignment between a folded end and an opposed side of the body;
   wherein the body is solid and linear in shape, and
   wherein a profile of the terminal has a predetermined size depending upon a pressure applied thereto.

2. The bus bar according to claim 1, wherein the terminal is formed by folding and stacking the at least one end of the body.

3. The bus bar according to claim 2, wherein the at least one end of the body folded into the terminal is annularly folded so that a hole is formed inside, and the at least one end of the body has a distal end stacked on at least one of the body or the end of the body.

4. The bus bar according to claim 3, wherein at least one of the end of the body folded into the terminal or a side of the body opposed to the folded end has a misalignment preventing portion which prevents misalignment between the folded end and the opposed side of the body.

5. The bus bar according to claim 4, wherein the body is formed in a three-dimensional manner so as to have a plurality of bent portions with different bending directions.

6. The bus bar according to claim 3, wherein the body is formed in a three-dimensional manner so as to have a plurality of bent portions with different bending directions.

7. The bus bar according to claim 2, wherein at least one of the end of the body folded into the terminal or a side of the body opposed to the folded end has the misalignment preventing portion.

8. The bus bar according to claim 7, wherein the body is formed in a three-dimensional manner so as to have a plurality of bent portions with different bending directions.

9. The bus bar according to claim 1, wherein the terminal includes a compensating member which is provided for compensating a thickness of the terminal and formed of a material identical with a material of the body, the compensating member being formed integrally with the body in a seamless manner.

10. The bus bar according to claim 9, wherein at least one of either the compensating member or the body has a side which is opposed to the other and has a misalignment preventing portion which prevents misalignment between the compensating member and the body.

11. The bus bar according to claim 10, wherein the body is formed in a three-dimensional manner so as to have a plurality of bent portions with different bending directions.

12. The bus bar according to claim 9, wherein the body is formed in a three-dimensional manner so as to have a plurality of bent portions with different bending directions.

13. The bus bar according to claim 1, wherein the body is formed in a three-dimensional manner so as to have a plurality of bent portions with different bending directions.

14. The bus bar according to claim 2, wherein the body is formed in a three-dimensional manner so as to have a plurality of bent portions with different bending directions.

15. A method of manufacturing a bus bar, comprising:
    preparing a solid linear body;
    forming at least one bent portion on the body; and
    pressing at least one end of the body thereby to form at least one of a plate-shaped or bar-like terminal on the body and simultaneously, to render a hardness of the terminal higher than a hardness of the body,
    folding the at least one end of the body to form the terminal; and
    providing a misalignment prevention portion on the terminal to prevent misalignment between a folded end and an opposed side of the body,
    wherein in the pressing, an applied pressure is adjusted so that a profile of the terminal has a required predetermined size.

* * * * *